Feb. 10, 1925.

F. T. CARSON 1,525,495

METHOD AND APPARATUS FOR TESTING THE PERMEABILITY OF FIBROUS MATERIAL

Filed Dec. 17, 1923

Inventor

Frederick T. Carson.

By Harry E. Knight

Attorney

Patented Feb. 10, 1925.

1,525,495

UNITED STATES PATENT OFFICE.

FREDERICK T. CARSON, OF WASHINGTON, DISTRICT OF COLUMBIA.

METHOD AND APPARATUS FOR TESTING THE PERMEABILITY OF FIBROUS MATERIAL.

Application filed December 17, 1923. Serial No. 681,260.

(GRANTED UNDER THE ACT OF MARCH 3, 1883; 22 STAT. L. 625.)

*To all whom it may concern:*

Be it known that I, FREDERICK T. CARSON, a citizen of the United States, residing at Washington, District of Columbia, have invented a certain new and useful Method and Apparatus for Testing the Permeability of Fibrous Material, of which the following is a specification.

The invention more particularly relates to a method and apparatus whereby the sizing qualities and characteristics of fibrous material may be definitely determined.

The object of the invention is to provide a method and apparatus whereby the physical property of fibrous sheet material to curl when subjected to moisture, may be utilized to accurately determine or ascertain the sizing qualities of said material.

It is also within the scope of the objects of the invention that the apparatus employed be extremely simple and certain in operation.

Other objects will hereinafter appear in the detailed description to follow.

My invention more particularly relates to the use of a physical property of a fibrous material such as sized paper or the like which is its tendency when floated on the surface of water to curl up into a cylindrical form with the machine direction as an axis, for the purpose of testing the degree of sizing of the paper or the like.

Sizing is that property imparted to paper by the introduction of various water resisting substances into the pulp in the course of manufacture of the paper.

"Sizefastness" or "sizing quality" is the result of the addition of these various substances and is that quality of paper by virtue of which it is capable of resisting to a greater or less degree the absorption of ink, water or other liquids having no solvent action upon the sizing in the paper. It is a matter of common knowledge among those who have had experience in the testing of paper that the amount of sizing materials introduced in a paper does not necessarily give any definite idea of the degree to which the paper will resist the absorption of ink or other liquids. As each particular use of paper must have a definite absorption value, it is evident that a method and means for directly determining this value is of great importance.

The various methods used heretofore to determine this value have been found unsatisfactory. The various modifications of the well known flotation test, which consists in noting the time required for a liquid to penetrate the sheet as judged by the depth of color produced by interacting solutions applied to opposite sides of the test samples, are open to serious criticism and objections. There is no end-point or phenomenon sufficiently definite to be relied upon as a criterion of the state of penetration.

Ink stroke tests in the hands of an experienced observer will differentiate between hard and slack-sized papers, but are of little value for testing papers of nearly the same sizing quality. Certain current modifications of the electrolytic method which is based on the assumption that the saturated samples offer no electrical resistance, or that equivalent resistant values represent equivalent degrees of permeation, are fundamentally at fault for the reason that the resistance per unit thickness of one kind of paper of a given surface area when saturated, may be several times as great as the corresponding resistance in the case of a different kind of paper. In my method hereinafter described the personal element in the test is eliminated and consequently a more uniform and accurate value of absorption is obtained.

In the drawings, which show by way of illustration one embodiment of the invention—

Figure 1:
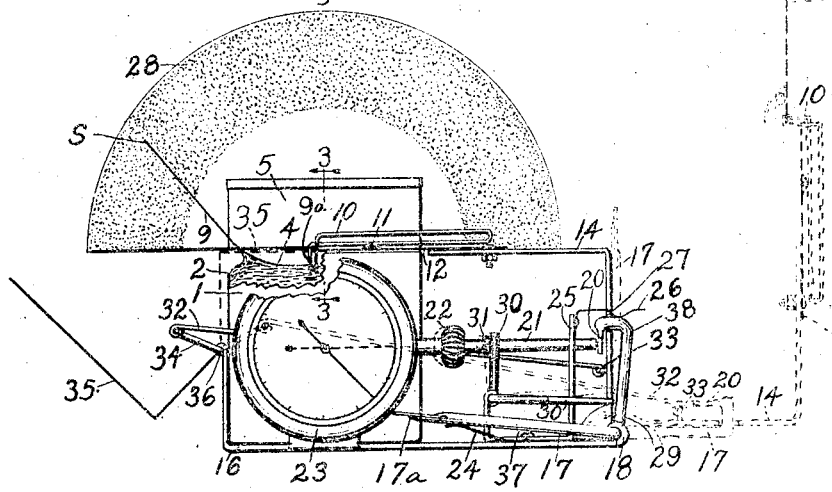
Figure 1 is a front view of the apparatus, partly diagrammatic.
Figure 2:
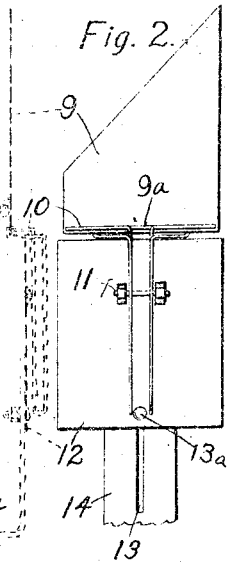
Figure 2 is a fragmentary plan view showing the test sample, spring clip holder, and adjustable cover plate.
Figure 3:
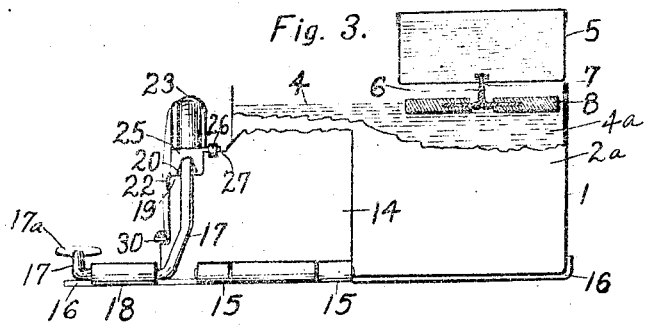
Figure 3 is a side view of the apparatus with the upper parts removed showing a vertical section along the line 3—3 of the auxiliary reservoir, needle float valve, and the upper part of the main reservoir.

In carrying out this invention there is provided a base 16, a reservoir 1 mounted in any convenient manner on the base, said reservoir being constructed in any suitable manner and having a side wall 2 preferably lower than its opposite side wall 2ᵃ. An auxiliary reservoir 5 is supported at some convenient place above the main reservoir 1 and has an aperture 7 in its base through which protrudes a needle valve 6. This valve 6 is supported on a float 8 which is disposed upon liquid 4ª in the main reservoir.

A test-sample holding-device 10 is provided and adapted to grasp and hold a sample fibrous sheet 9. This device is provided with a spring-actuated clip 9ª to hold the test-sample. This holding device is mounted on a cover plate 12 by a friction bolt 11 in such a manner as to permit of a slight rocking motion of said holding device. A follower plate 14 is pivotally secured to a base 16 by means of hinges 15—15. Cover plate 12 is adjustably secured to follower plate 14 by means of a bolt 13ª, said bolt extending through a slot 13 in the follower plate 14.

A bell crank lever 17 is pivotally secured to base 16 by a hinge 18, one arm 37 terminating in a thumb rest 17ª, the other arm 38 terminating in projection 20. Arm 38 of bell crank lever 17 is designed to contact with a step 27 of the projection 19 on the follower plate 14 when the parts are in the position shown by the broken lines in Figure 1.

A timing device which may be a stop watch 23, is suitably mounted, and a stem 22 of the watch is adapted to be engaged by a stem extension or rod 21, said rod being supported for longitudinal movement by an upright 25 and one end of a bell crank lever 30. If desired, the rod 21 may be integral with the stem 22. Suitable apertures are provided in the supports to permit the movement of the stem extension 21.

On the free end of the upright 25 is secured a retaining resilient member 26 which engages a step 27 of projection 19 on the follower plate 14, the function of the member 26 being to hold the follower plate 14 and parts attached thereto in operative position when the projection 19 of the follower plate 14 is not in contact with the bell crank lever arm 38. A further function of the resilient member 26 is to arrest the motion of the follower plate 14 by contact with the upper edge of step 27 in the above described movement of follower plate 14 to operative position. A yielding member 24 attached to base plate 16 is provided to disengage the contact relation of projection 20 with the stem extension 21. An eccentric quadrant 29 is attached to the follower plate 14 and resting on the quadrant 29 is one end of a bell crank arm 30; the other end as previously stated supports the stem extension 21. A collar 31 is mounted on the stem extension 21 which limits the movement of the bell crank arm 30 when it operates to reset the stop watch. It is obvious that these elements depress stem 22 and permit the watch hand or indicating element to return to zero position.

A cover plate 35 is provided for protecting the liquid in the reservoir 1 when the paper-test sample 9 is not in contact therewith, said plate being pivotally mounted at 36 to base 16. Attached to the cover plate 35 at pivot 36 is a crank 34, the movement of which is controlled by a link 32 fastened to follower plate 14 at 33, the function of said crank 34 being to actuate the movement of the cover plate 35 when the follower plate 14 is moved to the position shown in dotted lines in Figure 1.

A background 28 is mounted to extend above the main reservoir 1 against which the proportionate curling of the paper may be observed in connection with the observation of the adjacent timing element. If desired, this background 28 may be provided with a scale (not shown) or other means of measurement, whereby the comparative action of various types of fibrous material tested on the device may be recorded as of comparative values, determined by such scale.

In operating the device herein described the fibrous material to be tested is preferably cut in a triangular form, the base portion of which is inserted in the spring clip 9ª. The clip 9ª is so adjusted that a certain and predetermined portion of the under side of the paper comes in contact with the surface of the liquid in the main reservoir leaving the remainder untouched by the liquid. For different grades of paper it is desirable to wet a larger or smaller area as the case may be, and the adjustable cover plate 12 is provided for this purpose, the means to adjust which has been previously described. The surface of the liquid in the reservoir 1 stands slightly above its lower wall 2 presenting a rounded surface or meniscus convex upward, and it always remains at the same level by reason of the automatic influx of fluid from the auxiliary reservoir 5. The purpose of this arrangement is to wet but a given portion of the test sample 9 so that the dry portion or the upper part of the triangle, which acts as a pointer, will be carried across the field of vision (for example before the background 28) by the curling of the wetted portion.

At the instant the paper is placed in contact with the fluid in the reservoir 1, the projection 20 on the bell crank arm 17 moves the stem extension 21 of the stop watch forward and this stem extension depresses the stem 22 and sets the stop watch in motion.

In the ordinary operation of a stop watch the stem is depressed and the pressure immediately released. In my device the forward movement of the bell crank lever 17 depresses the stem of the stop watch, as described, and to automatically relieve the pressure on the stem, the spring 24 is provided which moves the arm 37 of the bell crank lever 17 upward which obviously moves the other arm 38 of the bell crank lever backward and out of contact relation with the stem extension. When this arm is moved away it is evident that it will be taken out of contact relation with the projection 19 of the follower plate 14 and the retaining spring member 26 is provided for holding the follower plate in the last named position, said spring engaging with the projection 19 of the follower plate for this purpose.

When that portion of the sample which is in contact with the liquid becomes sufficiently moistened, said portion will curl and thus swing upwardly the free end portion S of the sample. The curling of the paper is observed against the dotted background 28 and the moment the point S of the test sample 9 comes to rest, the bell crank arm 17 is depressed by its thumb rest 17$^a$, whereby the timing device is stopped.

The grades of paper to which this method is applicable range from a good news print to the finest bonds. The obvious advantage of this method is that definite and dependable data is secured from which a numerical value for the relative sizing quality of paper can be compiled. The apparatus is simple in construction, requiring a minimum of time for a test, and eliminating to a great extent the personal element in its operation.

To remove the test sample from the surface of the liquid the arm 37 of the bell crank lever 17 is raised and the projection 20 of the bell crank lever 17 comes in contact with the projection 19 of the follower plate and the parts are returned to the original position as shown by the dotted lines in Figure 1. Simultaneously and automatically with this movement the bell crank lever 30 operates to reset the stop watch 23 and the connecting link 32 attached to the follower plate actuates the cover plate crank 34, thus causing the cover plate 35 to assume its position over the liquid in the reservoir 1 which prevents the evaporation and cooling of the liquid.

The entire apparatus may be covered with any suitable cabinet having apertures therein through which the operator may observe the operation. A thermometer and a hygrometer (not shown) may also be held in some suitable manner by the cabinet for the obvious purpose of making corrections for temperature and humidity.

The invention described herein may be used by the Government, or any of its officers or employees in the prosecution of work for the Government, or by any other person in the employ of the United States, without payment of any royalty thereon.

What I claim is—

1. The method of determining the permeability of fibrous material, which consists in bringing a portion of one surface of one end of a strip of fibrous material into contact with a fluid and simultaneously starting a timing mechanism, permitting the material to remain in contact with the fluid until a physical change due to an absorption of the fluid at said contacting portion results in curling of the strip so as to cause the free end thereof to assume a predetermined maximum position with relation to its initial position and finally by calculation from the elapsed time between the time of fluid contact and the time of arrival of the free end at its maximum physical position and from known properties of the material, ascertaining the absorptive factor of the fibrous material.

2. The method of determining the permeability of fibrous material, which consists in bringing a portion of one surface of one end of a strip of fibrous material into contact with a fluid and simultaneously starting a timing mechanism, permitting the material to remain in contact with the fluid until a physical change due to an absorption of the fluid at said contacting portion results in curling of the strip so as to cause the free end thereof to assume a predetermined maximum position with relation to its initial position and finally determining the absorptive factor of the fibrous material by comparison of the elapsed time between the period of fluid contact and period of arriving at its maximum physical position with the time consumed for a standard sample to undergo a like change.

3. A device for testing the permeability of a fibrous sheet comprising means for bringing one face of the fibrous sheet into contact with a fluid, said means including a pivoted material holder which is movable from one position wherein the material is not in contact with the fluid to a position wherein the material is in contact with the fluid, a timing device, and means actuated by the material holder when moving from the first named position to the latter for setting in motion the timing device simultaneously with the moistening of the said sheet whereby the interval for its curling may be ascertained.

4. An apparatus for determining the sizing quality of fibrous material comprising means for moistening a portion of one face of the fibrous material whereby the movement of the dry portion of said material is effected by the curling of the moistened portion, a timing device and means actuated by the moistening means for automatically setting in motion said timing device simultaneously with the moistening of the fibrous material whereby the sizing quality of fibrous material may be determined as a function of the time.

5. An apparatus for determining the permeability of fibrous material comprising means for moistening the fibrous material whereby to effect the curling of the fibrous material, a timing device and means cooperating with the moistening means for automatically setting in motion said timing device simultaneously with the moistening of the fibrous material whereby the interval for the curling of the fibrous material may be ascertained.

6. An apparatus for determining the permeability of a fibrous sheet of material comprising a reservoir for holding liquid, means for contacting a portion of one side of the fibrous sheet with the surface of the liquid in the reservoir whereby to effect the curling of the fibrous material, an auxiliary reservoir for holding a like liquid as that in the main reservoir, means providing for the automatic influx of fluid from the auxiliary reservoir whereby the surface of the liquid in the main reservoir is maintained at a constant level, and a timing device for determining the time of curling of the fibrous material.

7. An apparatus for determining the permeability of fibrous material comprising means for contacting the surface of the fibrous material with the convex meniscus of a liquid whereby to effect the curling of the material, a reservoir for holding the liquid, and means for maintaining the convex meniscus at a constant level whereby the said fibrous material is held in contact with the surface of the liquid in a predetermined position.

8. An apparatus for determining the permeability of fibrous material comprising a liquid reservoir in which one wall is of a different height from that of its opposite walls, whereby the liquid forms a convex meniscus, means for contacting a portion of one face of fibrous material with the convex meniscus whereby a predetermined area of but one side of the fibrous material is wetted and which permits the unwetted free end to move upwardly with the curling of the wetted portion.

9. An apparatus for determining the permeability of fibrous material, comprising a reservoir for holding a fluid, a pivoted holder for the fibrous material, said holder being capable of movement from one position to another whereby said material is placed into and taken out of contact relation with said fluid, a timing device, and a crank arm cooperating with the pivoted holder whereby the timing device is reset when the fibrous material is moved out of contact relation with the fluid.

10. In an apparatus for testing the permeability of fibrous material including a reservoir for holding a liquid, a holder for said fibrous material, a stop watch, means adjustably connected to the holder for moving the same so as to bring the material carried thereby into contact relation with said liquid whereby to effect the curling of said material, said means effecting a pressure on the stem of said stop watch whereby to start its operation for the purpose of ascertaining the time of curling, and means whereby the said pressure effected by said mechanism is released.

FREDERICK T. CARSON.